US012759521B2

(12) United States Patent
Bonardo et al.

(10) Patent No.: US 12,759,521 B2
(45) Date of Patent: Oct. 13, 2026

(54) VALVE UNIT FOR AN ANTI-LOCK BRAKING SYSTEM

(71) Applicant: RAICAM DRIVELINE S.R.L., Mondovi' (IT)

(72) Inventors: Sandro Bonardo, Peveragno (IT); Andrea Canestrari, San Costanzo (IT)

(73) Assignee: RAICAM DRIVELINE S.R.L., Mondovi' (IT)

( * ) Notice: Subject to any disclaimer, the term of this patent is extended or adjusted under 35 U.S.C. 154(b) by 402 days.

(21) Appl. No.: 18/401,166

(22) PCT Filed: Jun. 27, 2022

(86) PCT No.: PCT/IB2022/055943
§ 371 (c)(1),
(2) Date: Dec. 29, 2023

(87) PCT Pub. No.: WO2023/281351
PCT Pub. Date: Jan. 12, 2023

(65) Prior Publication Data

US 2024/0336243 A1 Oct. 10, 2024

(30) Foreign Application Priority Data

Jul. 9, 2021 (IT) ........................ 102021000018107

(51) Int. Cl.
*B60T 8/36* (2006.01)

(52) U.S. Cl.
CPC .................................... *B60T 8/366* (2013.01)

(58) Field of Classification Search
CPC ......... B60T 8/366–3665; B60T 15/025; B60T 15/028
See application file for complete search history.

(56) References Cited

U.S. PATENT DOCUMENTS 3,879,090 A 4/1975 Holmes
3,995,652 A * 12/1976 Belart .................. B60T 8/3665 137/625.65

(Continued)

FOREIGN PATENT DOCUMENTS

EP 3561314 A1 10/2019
FR 2280001 A1 2/1976

OTHER PUBLICATIONS

International Search Report and Written Opinion issued in PCT/IB2022/055943, Sep. 19, 2022, Rijswijk, NL.

*Primary Examiner* — David R Morris
(74) *Attorney, Agent, or Firm* — Valauskas Corder LLC

(57) ABSTRACT

A valve unit for an anti-lock braking system of a vehicle which has a valve body, a cutoff piston movable in an inner cavity of the valve body, and sliding contact seals arranged at an interface between the cutoff piston and the inner cavity is provided. The internal cavity is hydraulically connectable with a delivery port to a brake caliper, an inlet conduit, and an expansion chamber. The sliding contact seals define with the cutoff piston and the inner cavity an axially movable hydraulic chamber. The cutoff piston is movable between a first position, in which the hydraulic chamber is in fluid communication with the expansion chamber and the delivery port, and not with the inlet conduit, and a second position, in which the hydraulic chamber is in fluid communication with the delivery port and the inlet conduit, and not with the expansion chamber.

8 Claims, 8 Drawing Sheets

(56) References Cited

U.S. PATENT DOCUMENTS

| | | | | | |
|---|---|---|---|---|---|
| 4,714,301 | A * | 12/1987 | Farr | B60T 8/74 303/115.6 |
| 5,069,420 | A | 12/1991 | Stobbs et al. | |
| 5,244,260 | A * | 9/1993 | Kervagoret | B60T 7/22 303/117.1 |
| 6,206,038 | B1 | 3/2001 | Klein et al. | |
| 2019/0322258 | A1* | 10/2019 | Besliu | B60T 8/5043 |

* cited by examiner

VALVE UNIT FOR AN ANTI-LOCK BRAKING SYSTEM

CROSS-REFERENCE TO RELATED APPLICATIONS

This application is a U.S. National Phase filing of PCT International Patent Application No. PCT/IB2022/055943, having an international filing date of Jun. 27, 2022, which claims priority to Italian Patent Application No. 102021000018107, filed Jul. 9, 2021 each of which is hereby incorporated by reference in its entirety.

TECHNICAL FIELD

The present invention relates to a valve unit for a hydraulic braking system for controlling the anti-lock function of a wheel of a vehicle, particularly a two-wheeled vehicle such as a bicycle.

BACKGROUND ART

Anti-Lock Braking Systems ("ABS") have been installed on vehicles with hydraulic brakes to prevent skidding, or uncontrolled sliding, by reducing the effects of an abrupt stop. In an ABS braking system, all wheels of a vehicle are equipped with brake discs and associated phonic wheel sensors or equivalent elements, rotationally integral with the brake discs. The sensors detect the rotation speeds of the wheels to which they are associated and send signals indicative of the rotation speeds to an Electronic Control Unit (ECU) which processes the rotation signals received. Each brake disc is associated with a brake caliper. A master cylinder, actuated by a control (hand lever control in a bicycle) activates the brake calipers through respective hydraulic circuit, on each of which an ABS valve unit is installed. Each ABS valve unit controls the flow and pressure of the brake fluid towards the associated brake caliper, in response to electrical control signals from the electronic control unit. When the ECU detects a condition indicative of an imminent wheel locking, it operates the respective ABS valve to reduce the hydraulic pressure on the brake at the affected wheel, thus reducing the braking force on this wheel, so that the wheel remains braked but can rotate. This process is repeated continuously during braking, several times per second, preventing the vehicle from skidding.

Valve units have been proposed for an anti-lock braking system of a vehicle, wherein the valve unit comprises a valve body with a delivery port hydraulically connectable to a brake caliper, an inlet port hydraulically connectable to a master cylinder, a primary hydraulic chamber in fluid communication with the delivery port and a second hydraulic expansion chamber. An outflow passage provides fluid communication between the primary hydraulic chamber and the expansion chamber, and a bypass passage provides fluid communication between the inlet port and the delivery port. A piston is axially movable in the hydraulic chamber, operated by a solenoid controlled by an electronic control unit, in contrast to the force of an elastic element. Under normal braking conditions, the force of the elastic element holds the piston in a position in which it occludes the outflow passage but does not occlude the bypass passage. Under locked-wheel braking conditions, the piston is moved to a position wherein it occludes the bypass passage while clearing the outflow passage, allowing part of the brake fluid to drain from the primary hydraulic chamber into the outflow chamber. As a result, the pressure on the caliper is reduced, unlocking the wheel.

In some recently proposed solutions, the movable piston in the primary chamber has a longitudinal cavity that extends through the piston between an end face of the piston, facing the delivery port, and a transverse passage that ends at a side surface of the piston. Overall, the piston has a first transverse surface facing the delivery port and a second transverse surface opposite the first transverse surface and facing away from the delivery port, and wherein the first transverse surface has an area less than the area of the second transverse surface.

Due to the longitudinal through cavity in the movable piston, the pressure drop in the primary hydraulic chamber also simultaneously reduces the pressure of the brake fluid in the branch of the hydraulic circuit that extends from the delivery port to the brake caliper. The braking force exerted by the brake caliper is thus decreased, unlocking the wheel.

SUMMARY OF THE INVENTION

A primary object of the present invention is to provide an improved ABS valve unit, which can be activated more rapidly and effectively as compared to known ABS valve units. In particular, it is desirable to provide an ABS valve unit having a higher operating frequency, characterized by a sequence of brake activation and release cycles having very short duration.

According to an aspect, the present invention provides a valve unit for a hydraulic braking system to control the anti-lock function of a wheel of a vehicle. Preferred embodiments are also described.

In summary, a valve unit for an anti-lock braking system of a vehicle comprises a valve body, a cutoff piston movable in an internal cavity of the valve body, and sliding contact sealing elements arranged at the interface between the cutoff piston and the internal cavity. The valve body has a delivery port hydraulically connectable to a brake caliper, an inlet conduit hydraulically connectable to a master cylinder, the axially elongated internal cavity hydraulically connectable to the inlet conduit and the delivery port. The valve body further comprises an expansion chamber expandable as opposed to an elastic element, an outflow passage between the cylindric cavity and the expansion chamber, and a non-return valve arranged between the expansion chamber and the inlet conduit. The cutoff piston is axially movable in the internal cavity against the action of an associated elastic element. The sliding contact sealing elements define with the cutoff piston and the internal cavity an axially moving hydraulic chamber. The cutoff piston is movable between two alternative axial positions:

- a first axial position, wherein the piston is urged by an actuator such as a solenoid, compressing the associated elastic element, and moves the hydraulic chamber by placing it in fluid communication with the expansion chamber and the delivery port, and not with the inlet conduit, and
- a second axial position, wherein the piston is not urged by the solenoid actuator, the associated elastic element is released, and thus the piston moves the hydraulic chamber by placing it in fluid communication with the delivery port and the inlet conduit, and not with the expansion chamber.

BRIEF DESCRIPTION OF THE DRAWINGS

In order that the present invention may be clearly understood, few preferred embodiments will now be described, given by way of example, reference being made to the accompanying drawings, wherein.

DETAILED DESCRIPTION OF THE INVENTION

Figure 1:
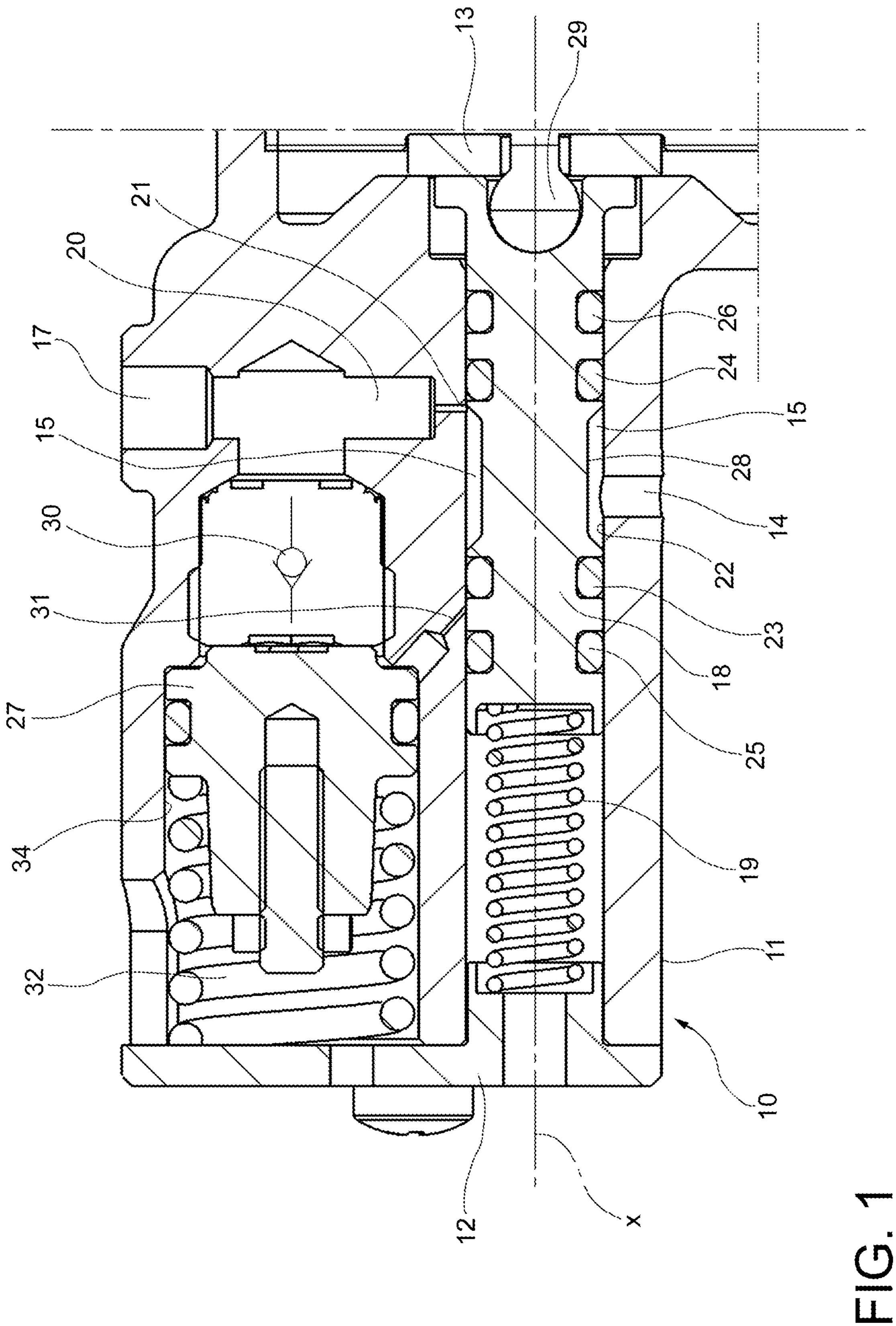
FIGS. 1 to 4 are longitudinal section views of a valve unit according to a first embodiment of the present invention, in different operating conditions.

Referring initially to FIGS. 1 to 4, the number 10 define as a whole an ABS valve unit for an anti-lock braking system for a wheel of a vehicle, in particular a two-wheeled vehicle, typically a bicycle.

The valve unit 10 defines a longitudinal axis x and has an elongated shape in the direction defined herein as longitudinal or axial. In this context, terms indicating positions and orientations such as "longitudinal", "transverse" and "radial", should be construed as referring to the x axis.

The valve unit 10 comprises a body 11 defining a longitudinal direction of actuation. In this example, the body 11 has an overall elongated shape in longitudinal direction, with a first end 12 and a second end 13 opposite the first.

The body 11 forms a delivery port (or outlet port) 14, hydraulically connectable to a brake caliper (not shown) of the brake of a vehicle wheel, and an inlet port 17, hydraulically connectable to a master cylinder (or principal cylinder), not shown, which is operatively associated with a drive control on the vehicle. The drive control may typically be a hand lever placed on the handlebar of a bicycle.

The valve unit includes a cutoff valve which, as will be explained below, has the effect of interrupting direct fluidic communication between the inlet port and the delivery port.

The cutoff valve includes an axially extended cylindric cavity 22 formed in the body 11, which is hydraulically connectable with the delivery port 14 and the inlet port 17. The cylindrical cavity 22 receives a piston 18 in an axially sliding manner.

An inlet conduit 20 hydraulically connects the inlet port 17 with the cylindrical cavity 22, and opens on it with a bore 21.

The cutoff piston 18 is axially actuated in the cylindrical cavity 22 by a drive stem 29 connected, in a per se known manner, to an actuating solenoid (not shown), which is activated by electrical controls from an electronic control unit (not shown) that receives and processes electrical signals from respective rotation sensors associated with the brake discs of each wheel. The constructional and operational features of the electronic control units in question are known and are not per se relevant to the understanding of the invention, and will therefore not be described herein.

Arranged in the cylindrical cavity 22 is an elastic element 19, preferably a compression spring, which elastically urges the cutoff piston 18 towards the body end 13, in contrast to the thrust action exerted by the drive stem 29.

At the interface between the cutoff piston and the cylindrical cavity 22 there are provided several seals performing a sliding contact sealing action between the cutoff piston 18 and the body 11 of the valve unit.

In the embodiment shown in FIGS. 1-4, the cutoff piston 18 has a transversally narrowed or smaller diameter intermediate section 28, which defines with the cylindrical cavity 22 an axially movable hydraulic chamber 15, having two axially opposite ends bounded by a first and second O-ring seals 23, 24, respectively, mounted on the cutoff piston 18.

Third and fourth O-ring seals 25, 26 are mounted on the cutoff piston 18 close to the first two seals 23, 24, in axially external positions thereof.

A second cylindrical cavity 34 is formed in the body 11, communicating with the cylindrical cavity 22 through an outflow passage 31. The outflow passage 31 opens at one end of the second cylindrical cavity 34 arranged toward the inlet port 17.

The second cylindrical cavity 34 is in fluid communication with the inlet conduit 20 through a non-return valve 30 interposed between the hydraulic expansion chamber and a junction on the inlet conduit located intermediate the inlet port 17 and the cylindrical cavity 22.

Figure 2:
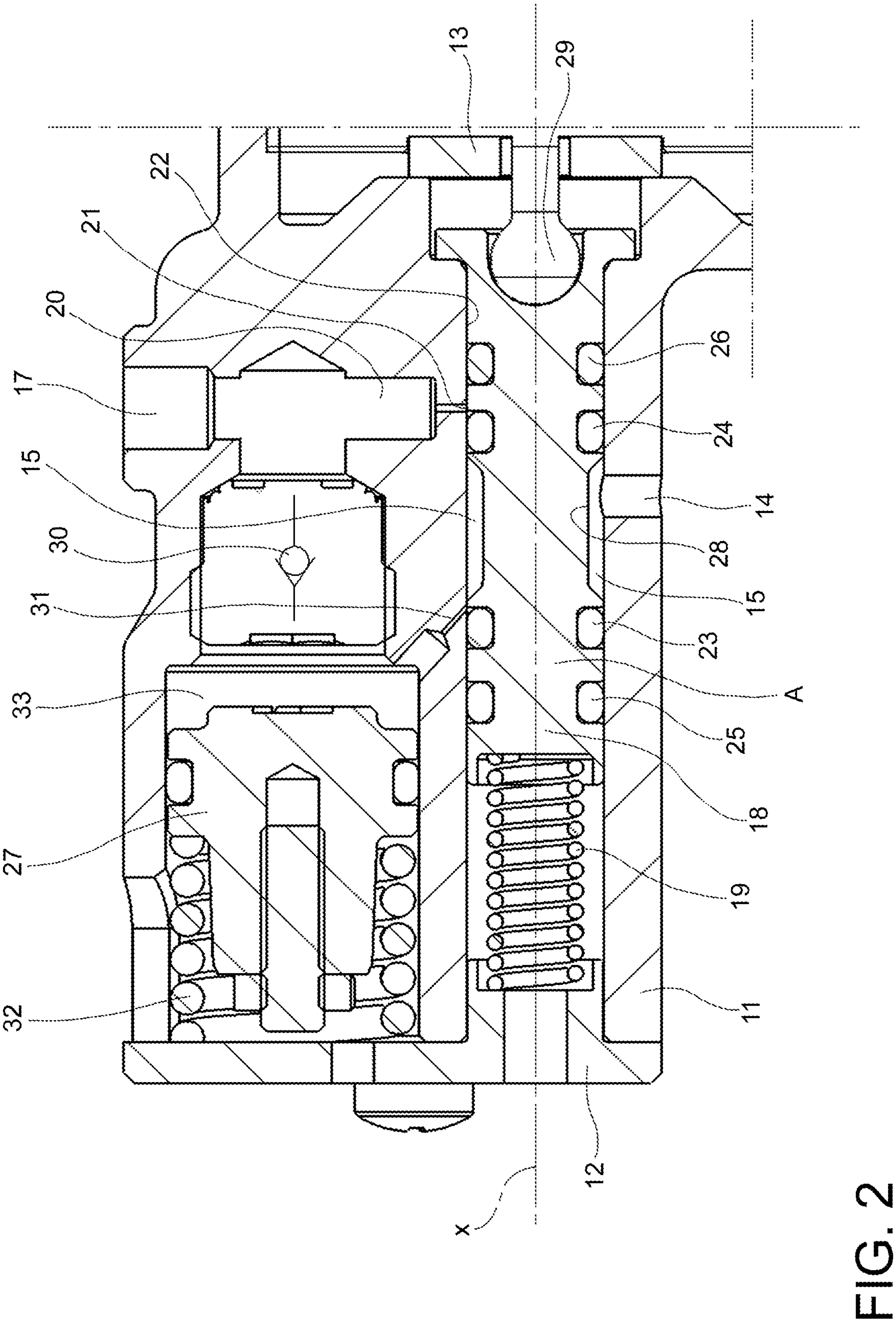
Figure 3:
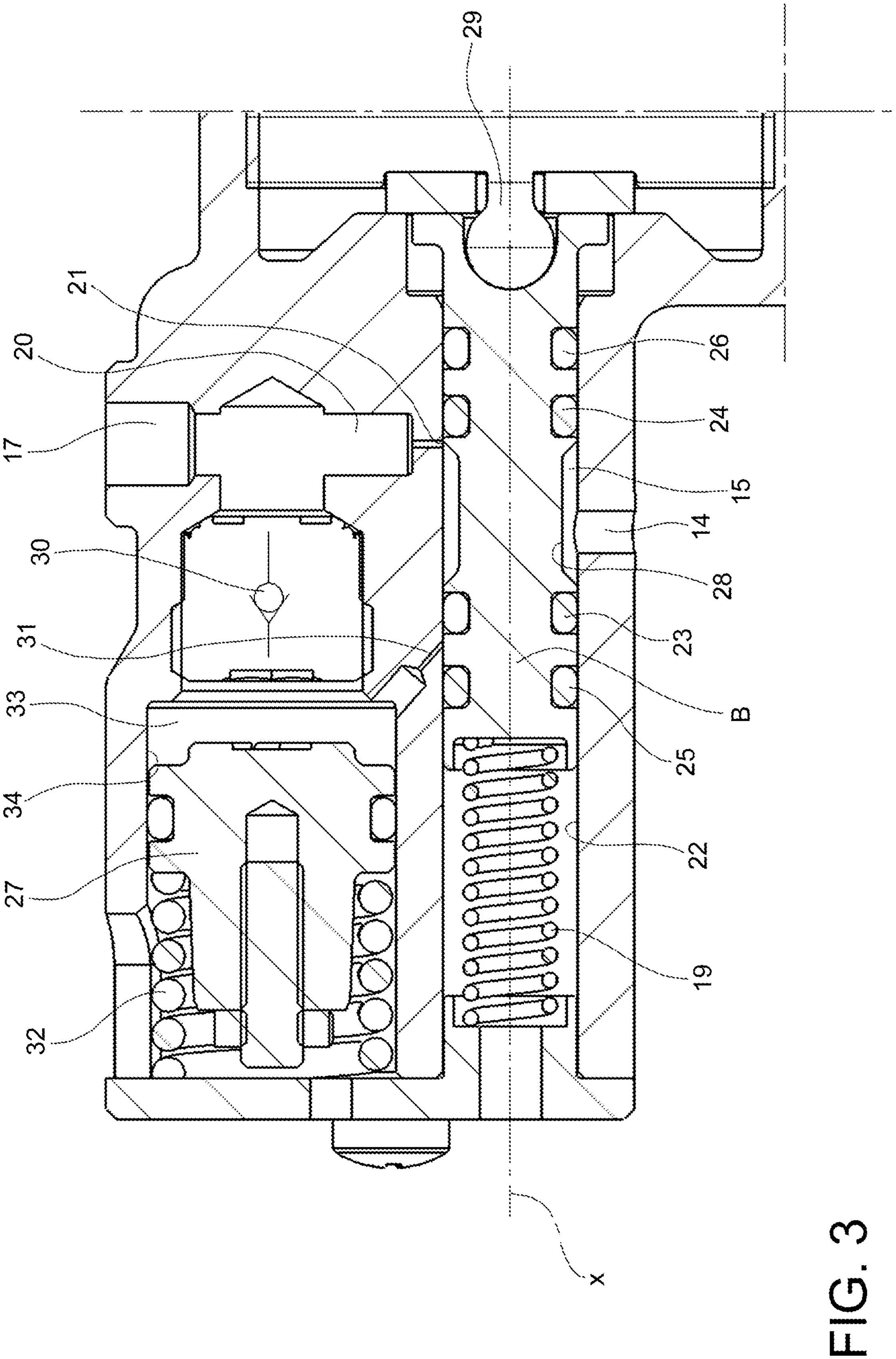
Figure 4:
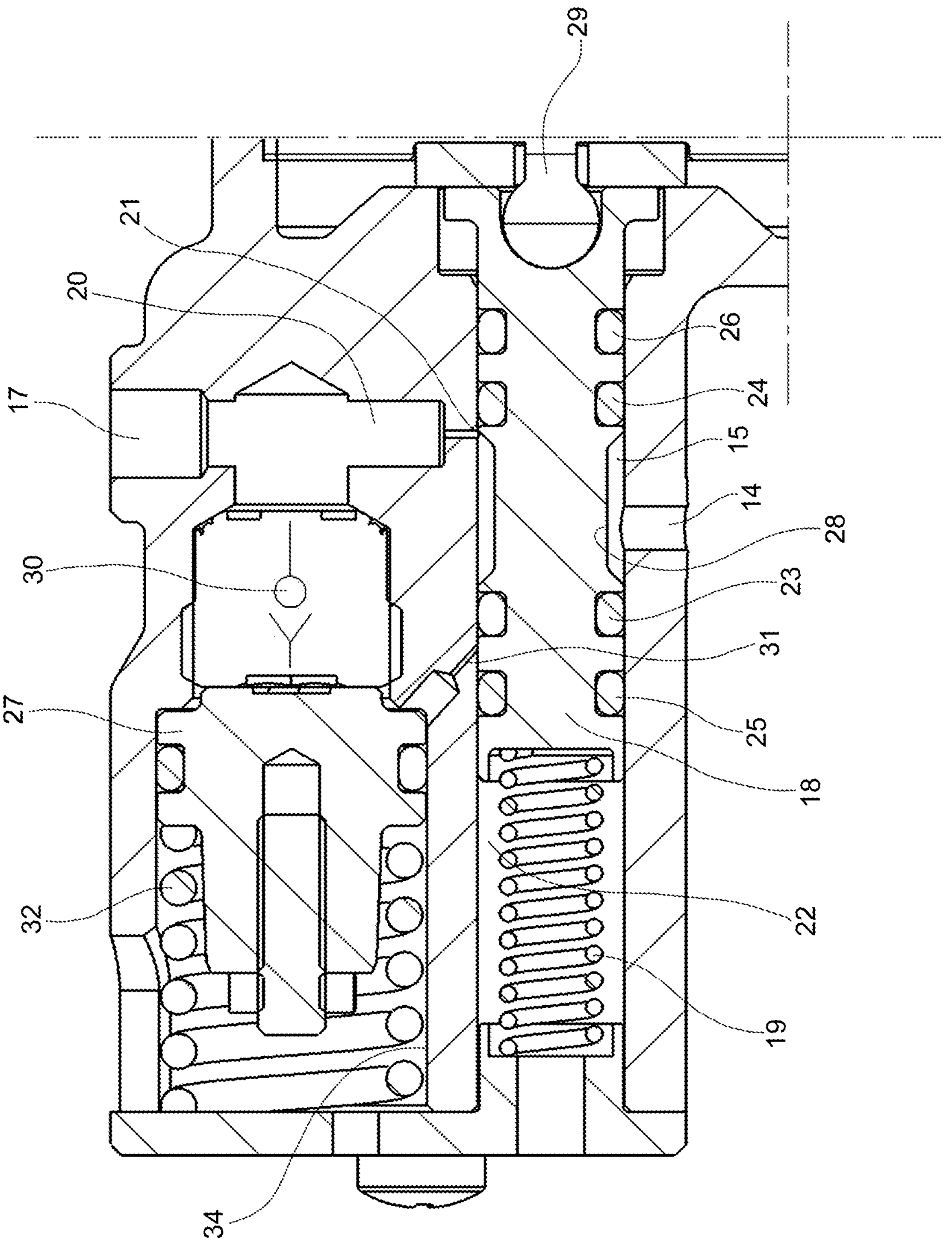

The second cylindrical cavity 34 houses a floating piston 27 and a second compression spring element 32, which urges the floating piston toward the non-return valve, and thus toward the inlet port. The second cylindrical cavity 34 and the floating piston 27 together define a hydraulic expansion chamber 33 (FIG. 2). As described below, the introduction of pressurized brake fluid from the axially movable hydraulic chamber 15 into the expansion chamber 33 through the outflow passage 31 causes the floating piston 27 to move away from the inlet port 17 and non-return valve 30, in opposition to the thrust of the second spring element 32.

FIG. 1 illustrates the ABS valve unit in a normal braking operating condition, i.e. without locking the braked wheel. The ABS actuation solenoid is not active. The compression spring 19 holds the cutoff piston 18 urged to the right, abutting against an abutment at the right end 13 of the body 11. The bore 21 of the inlet conduit communicates with the axially movable hydraulic chamber 15. Brake fluid entering from the inlet port transits through the ABS valve unit passing through the conduit 20 into the axially movable hydraulic chamber 15 and thus exiting through the delivery port 14. The annular seal 23 is interposed between the axially movable hydraulic chamber 15 and the outflow passage 31, whereby the brake fluid cannot reach the expansion chamber 33, which is empty. The floating piston 27 is biased by the spring 32 to abut against one end of the second cylindrical cavity on the side of non-return valve 30.

Under locked wheel braking conditions (FIG. 2), the electronic control unit on the vehicle receives speed signals from the wheel sensors indicative of a locked or skidding situation on at least one of the vehicle's wheels. Under these conditions, the electronic control unit sends an activation signal to the actuating solenoid of the ABS valve unit 10. The stem 29 of the solenoid moves the cutoff piston 18 to the left. The bore 21 of the inlet conduit is no longer in communication with the axially movable hydraulic chamber 15 because the seal 24 is now interposed between the bore 21 of the inlet conduit 20 and the hydraulic chamber 15.

The hydraulic circuit from the master cylinder to the brake caliper is therefore temporarily interrupted and divided by the cutoff piston 18 into two temporarily non-communicating sections. The hydraulic chamber 15 is now communicating with the brake caliper and expansion chamber 33 (FIG. 2), but is no longer communicating with the inlet port and master cylinder upstream thereof.

The high pressure of the brake fluid contained in the section of the circuit downstream of the cutoff piston, and now communicating with the expansion chamber 33 through the hydraulic chamber 15 and the outflow passage 31, causes the floating piston 27 to move to the left, in opposition to the elastic force of the spring 32. The volume of the expansion chamber 33 increases, and as a result the pressure of the brake fluid located in the portion of the circuit between the ABS unit and the brake caliper is instantaneously reduced.

The brake caliper then releases, allowing the brake disc and the associated wheel to rotate. The solenoid is temporarily deactivated by the electronic control unit, thereby allowing the spring 19 to urge the cutoff piston 18 to the right (FIG. 3), returning it to its initial position in which it reopens direct fluidic communication from the inlet conduit 20 to the delivery port 14 through the axially movable hydraulic chamber 15.

The solenoid is then immediately reactivated, in accordance with a known operating mode, by moving the cutoff piston 18 to the left again, which closes the direct fluidic communication between the brake caliper and the master cylinder, and sets the brake caliper and the expansion chamber 33 in fluidic communication again, injecting further high-pressure fluid brakes into it and causing the expansion chamber to increase further in volume. The further increase in volume, reduces once again and instantaneously the fluidic pressure in the brake caliper, releasing it.

The above sequence continues for a few seconds, moving each time the floating piston 27 more to the left, progressively increasing the volume of the expansion chamber 33. At the end of the braking action, the user releases the brake control, whereby the brake fluid pressure within the inlet conduit 20 drops and reaches a value lower than the pressure of the brake fluid within the expansion chamber 33. This pressure difference causes the non-return valve 30 (FIG. 4) to open, so that the spring 32 can extend and bias the floating piston 27 toward the inlet conduit 20, emptying the expansion chamber 33 and returning the brake fluid that had accumulated in the expansion chamber back into the brake circuit.

As it will be appreciated, the operation of the ABS valve unit involves alternating short length and rapid movements of a thin, low mass cutoff piston, with close displacements over time of minute volumes of brake fluid that are rapidly discharged into the expansion chamber, allowing for very rapid operation.

In the FIGS. 5 to 8 is shown a second embodiment of an ABS valve unit 10 according to the present invention. The general configuration of the valve unit depicted in FIGS. 5-8 is to be considered similar to that of the embodiment of FIGS. 1 to 4, except for the arrangement of the cutoff piston and the associated seals. Accordingly, the following description will be made almost exclusively with reference to the differences of the second embodiment with respect to the first one, it being understood that the parts not described are to be considered identical or substantially identical to the parts that have already been described with reference to FIGS. 1-4.

The cutoff valve of the second embodiment provides an axially extended cylindrical cavity 22 that hydraulically communicates with the delivery port 14, the inlet port 17 and the expansion chamber 33. The cylindrical cavity 22 receives in an axially sliding manner a cutoff piston 118.

The cutoff piston 118 provides a transversally narrowed or smaller diameter intermediate section 128, on which a movable lip seal 123 is mounted, performing sliding contact against the cylindrical cavity 22.

At least one transversal passage 130*a*, 130*b* is formed in the cutoff piston 118, extending into the interior of the piston, and opening with at least two axially spaced apart openings 131, 132: a first opening 131 is arranged on the narrow section of the piston, closer to the outflow passage 31 and a second opening 132 is arranged on a cylindrical surface 129 of the piston, further away from the outflow passage 31.

Preferably, as shown in the example in FIGS. 5-8, a plurality of intercommunicating transversal passages 130*a*, 130*b* is provided, extending within the cutoff piston and opening onto the narrow intermediate section 128 and the lateral cylindrical surface 129 of the piston at one or more positions axially spaced from the narrow section 128.

The transversal passages 130*a*, 130*b* may include at least one passage having inclined sections 130*a* that open onto the narrow section 128 of the piston and join at a central zone of the piston, and at least two radial sections 130*b* that join the inclined sections 130*a* at an inner zone of the cutoff piston. Various arrangements, alternative to the one shown, are possible. Multiple internal passages may be arranged in axial planes angularly spaced about the x-axis to provide a plurality of circumferentially spaced openings on the narrow section of the piston and its cylindrical surface. The radial or inclined arrangement of the sections comprising the transversal passages, as well as their number and size, may be made according to various layouts, provided that a fluidic communication between the narrow section of the piston and its cylindrical surface is achieved.

A static lip seal 124 is mounted on the body 11 in a radially enlarged portion 122 of the cavity 22 and arranged in an axially intermediate position between the outflow passage 31 and the inlet conduit 20.

The cutoff piston 118 identifies with the cylindrical cavity 22 an axially movable, or axially extendable, hydraulic chamber 115 having two axially opposite ends bounded by the lip seals 123, 124 acting in sliding contact at the interface between the cutoff piston 118 and the cylindrical cavity 22.

Third and fourth O-ring seals 25, 26 are mounted on the cutoff piston 118 and on the body 11, close to the lip seals 123, 124, respectively, at axially external positions with respect thereto. The seal 125 acts in sliding contact against the cylindrical cavity 22, whereas the seal 126 acts in sliding contact against the cylindrical surface 129 of the cutoff piston 118.

Figure 5:
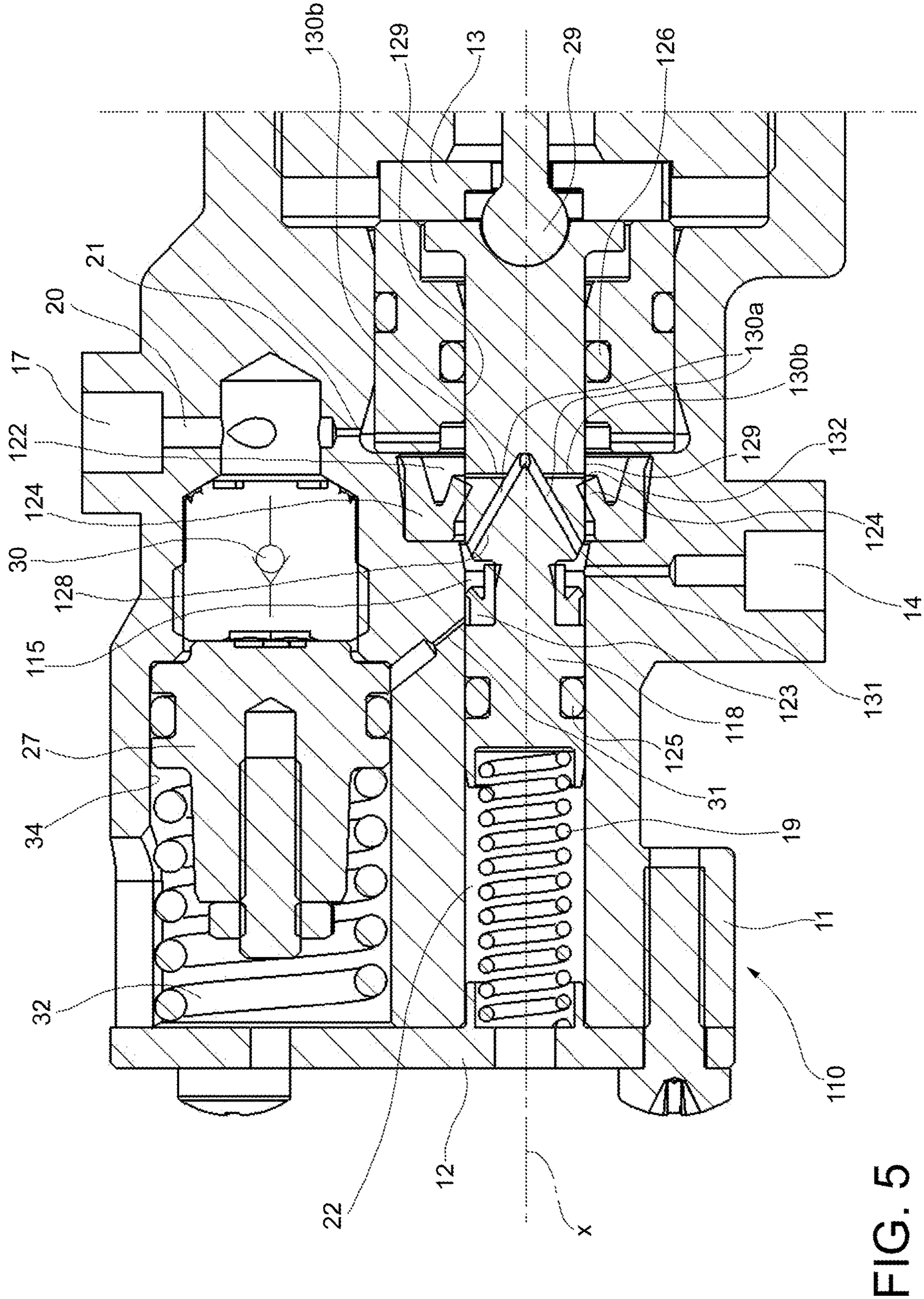
FIGS. 5 to 8 are longitudinal section views of a valve unit according to a second embodiment of the present invention, in different operating conditions.
Figure 6:
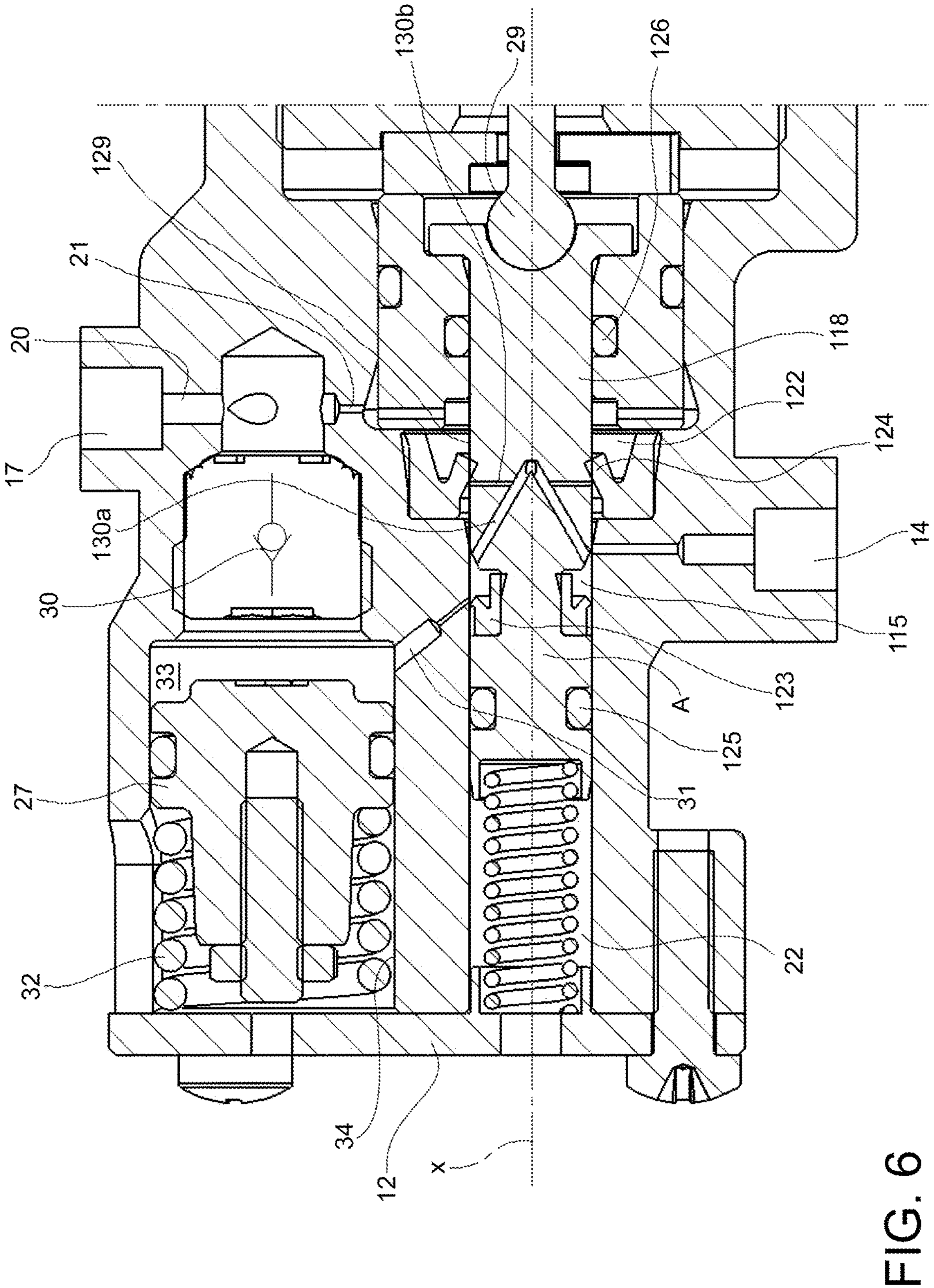
Figure 7:
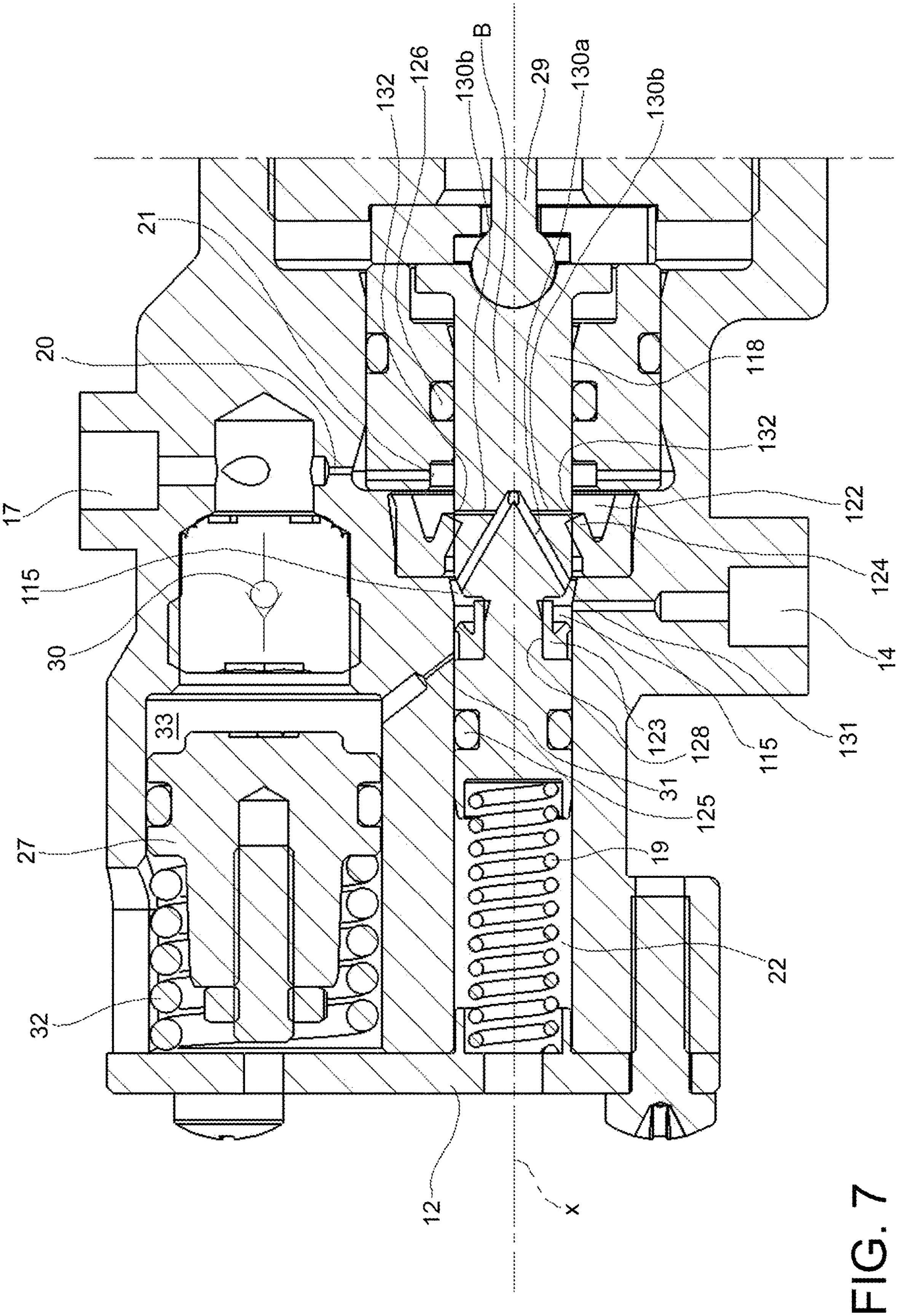
Figure 8:
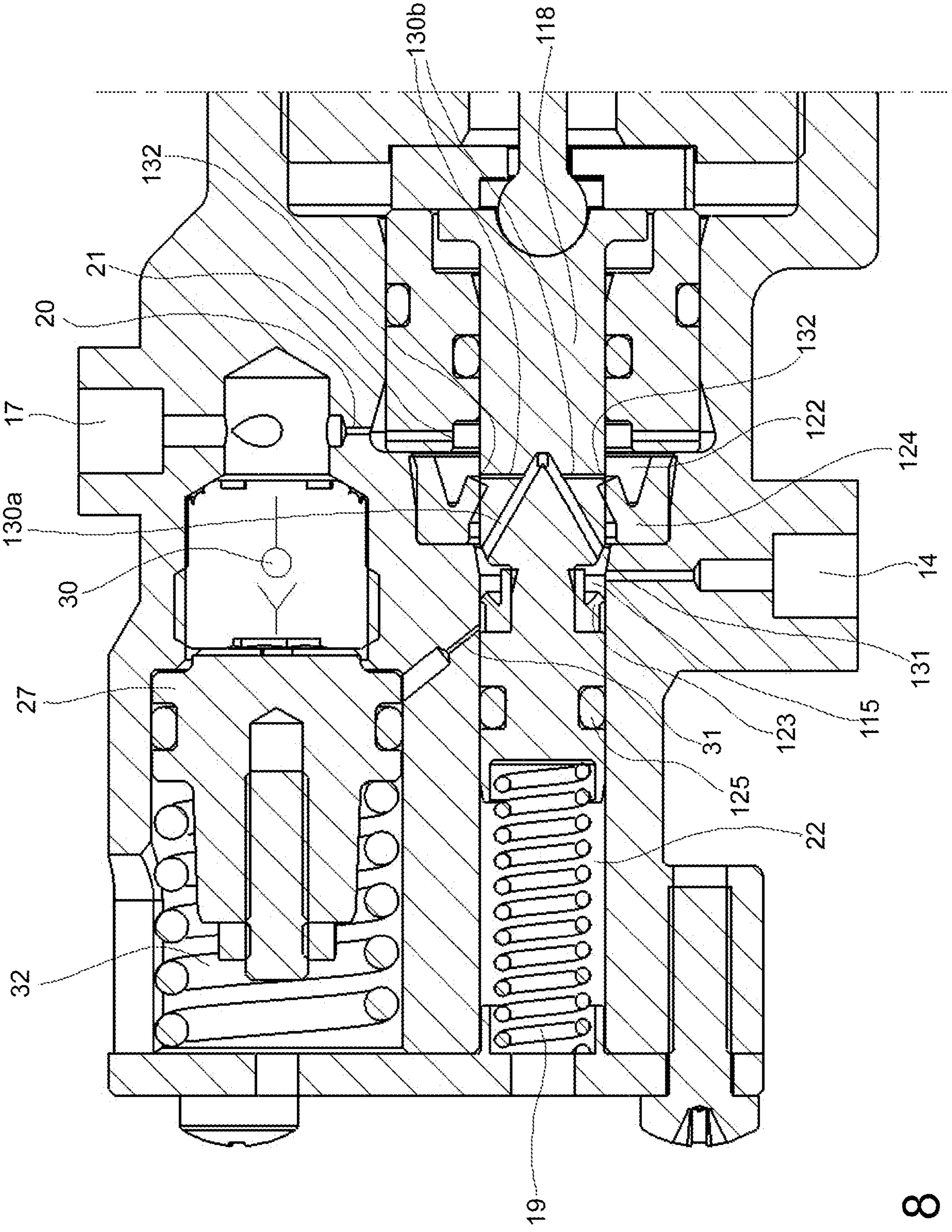

In FIG. 5, the ABS valve unit is shown in a normal braking operating condition, i.e. without locking the wheel that is braking. The ABS actuation solenoid is not activated. The compression spring 19 holds the cutoff piston 118 biased to the right, abutting against an abutment bearing at the right end 13 of the body 11. The bore 21 of the inlet conduit 20 communicates with the hydraulic chamber 115 via the passages 130. The brake fluid entering from the inlet port 17 transits through the ABS valve unit passing from the inlet conduit 20 to the hydraulic chamber 115 via the passages 130*b* and 130*a*, and then exiting through the delivery port 14. The movable lip seal 123 separates the hydraulic chamber 115 from the outflow passage 31, so that the brake fluid cannot reach the expansion chamber 33, which is empty. The floating piston 27 is urged by the spring 32 to abut against one end of the second cylindrical cavity on the side of the non-return valve 30.

Under locked wheel braking conditions (FIG. 6), the vehicle's electronic control unit receives speed signals from the wheel sensors indicative of a locked or skidding condition on at least one of the vehicle wheels. Under these conditions, the electronic control unit sends an activation signal to the actuating solenoid of the ABS valve unit 110. The stem 29 of the solenoid moves the cutoff piston 118 toward the outflow passage (to the left, arrow A). The inlet conduit 20 is no longer in communication with the hydraulic chamber 115 because the lip seal 124 is now interposed between the bore 21 and the cutoff piston 118 passages 130*b*.

The hydraulic circuit running from the master cylinder to the brake caliper is therefore temporarily interrupted and divided by the cutoff piston 118 into two temporarily non-communicating sections. The hydraulic chamber 115 is now communicating with the brake caliper and the expansion chamber 33 (FIG. 6), but is no longer communicating with the inlet port and the master cylinder upstream thereof.

The high pressure of the brake fluid contained in the section of the circuit downstream of the cutoff piston, and now communicating with the expansion chamber 33 through the hydraulic chamber 115 and the outflow passage 31, causes the floating piston 27 to move to the left, in opposition to the elastic force of the spring 32. The volume of the expansion chamber 33 increases, and, as a result, the pressure of the brake fluid contained in the circuit portion between the ABS unit and the brake caliper is instantaneously reduced.

The brake caliper then releases, allowing the brake disc and associated wheel to rotate. The solenoid is momentarily deactivated by the electronic control unit, thereby allowing the spring 19 to bias the cutoff piston 118 to the right (FIG. 7, arrow B), returning it to its initial position. The opening 132 of the passage 130*b* has passed beyond the lip seal 124, so that direct fluid communication from the inlet conduit 20 to the delivery port 14 through the axially movable hydraulic chamber 115 is restored.

The solenoid is then immediately reactivated, in accordance with known operation modes, by moving the cutoff piston 118 to the left again, which brings the opening 132 back to the left of the lip seal 124, thereby closing the direct fluid communication between the brake caliper and the master cylinder, and setting the brake caliper in fluid communication with the expansion chamber 33 again. Thus, an additional amount of high-pressure brake fluid is injected into this chamber, further increasing the volume of the expansion chamber. The further increase in volume again instantly reduces the fluid pressure in the brake caliper, releasing it.

The above sequence continues for a few seconds, each time moving the floating piston 27 further to the left, with a progressive increase in the volume of the expansion chamber 33. At the end of the braking action, the user releases the brake control, whereby the pressure of the brake fluid in the inlet conduit 20 drops and reaches a value lower than the pressure of the brake fluid that is within the expansion chamber 33. This pressure difference causes the non-return valve 30 to open, so that the spring 32 can release and bias the floating piston 27 toward the inlet conduit 20, emptying the expansion chamber 33 and returning the brake fluid that had accumulated in the expansion chamber back into the brake circuit.

It will be appreciated that the embodiment of FIGS. 5-8 results in an extremely short actuation stroke for the cutoff piston 118, which is required to move the opening 132 of the passage section 130*b* from one side of the lip seal 124 to the other. The lip seal exerts a sliding contact sealing action along a contact area having a very short axial length, so that the actuation stroke of the cutoff piston can be correspondingly very short, with close in time displacements of minimal volumes of brake fluid being rapidly discharged into the expansion chamber, allowing for very rapid operation.

While specific embodiments of the invention have been described, it should be understood that this disclosure has been provided merely for illustrative purposes and that the invention should not be limited in any way by it. Various modifications will be apparent to those skilled in the art in view of the foregoing examples. The scope of the invention is limited only by the appended claims.

The invention claimed is:

1. A valve unit for an anti-lock braking system of a vehicle, comprising:

a valve body with a delivery port hydraulically connectable to a brake caliper, an inlet port hydraulically connectable to a master cylinder, an axially elongated internal cavity hydraulically connectable to the inlet port and the delivery port, an expansion chamber expandable in contrast to a spring element, an outflow passage between the axially elongated internal cavity and the expansion chamber, and a non-return valve arranged between the expansion chamber and the inlet port;

a cutoff piston, axially movable in the axially elongated internal cavity in contrast to an action of an associated elastic element, sliding contact sealing elements arranged at an interface between the cutoff piston and the axially elongated internal cavity, defining with the cutoff piston and with the axially elongated internal cavity an axially movable hydraulic chamber;

wherein the cutoff piston is movable between two alternative axial positions:

a first axial position, in which the cutoff piston compresses the associated elastic element, and moves the axially movable hydraulic chamber placing the axially movable hydraulic chamber in fluid communication with the expansion chamber and the delivery port, and not with the inlet port, and a second axial position, in which the associated elastic element is released and the cutoff piston places the axially movable hydraulic chamber in fluid communication with the delivery port and the inlet port, and not with the expansion chamber, and wherein the axially movable hydraulic chamber is axially extendable and is bounded by:

a transversely restricted intermediate section of the cutoff piston;

a movable annular lip seal, mounted in the transversely restricted intermediate section of the cutoff piston and acting in sliding contact against a cylindrical surface of the axially elongated internal cavity;

a portion of a cylindrical surface of the cutoff piston;

a static annular lip seal, mounted in a transversely enlarged portion of the axially elongated internal cavity and arranged in an axially intermediate position between the outflow passage and the inlet port and acting in sliding contact against the cylindrical surface of the cutoff pison; and a section of the axially elongated internal cavity.

2. The valve unit of claim 1, wherein the axially movable hydraulic chamber is delimited by:

two annular seals mounted axially spaced apart on the cutoff piston and acting in sliding contact against the cylindrical surface of the axially elongated internal cavity;

the transversely restricted intermediate section of the cutoff piston comprised between the two annular seals on the cutoff piston; and the cylindrical surface of the axially elongated internal cavity.

3. The valve unit of claim 2, wherein the two annular seals are O-ring seals.

4. The valve unit of claim 2, further comprising a third annular seal and a fourth annular seal, mounted on the cutoff piston adjacent to said two annular seals, in axially external positions with respect thereto.

5. The valve unit of claim 1, wherein formed in the cutoff piston is at least one transverse passage, which extends into the cutoff piston, and which opens with at least two axially spaced openings: a first opening arranged on the transversely restricted intermediate section of the cutoff piston, at a position axially closer to the outflow passage, and a second opening arranged on the cylindrical surface of the cutoff piston, at a position axially farther from the outflow passage.

6. The valve unit of claim 5, comprising a plurality of intercommunicating transverse passages, that extend inside the cutoff piston and open on the transversely restricted intermediate section and on the cylindrical surface of the cutoff piston in one or more positions axially spaced from the transversely restricted intermediate section.

7. The valve unit of claim 5, wherein the at least one transverse passage has an inclined portion and at least one radial portion, and wherein the inclined and radial portions join in an internal area of the cutoff piston.

8. The valve unit of claim 1, comprising a third O-ring seal and a fourth O-ring seal mounted respectively on the cutoff piston and in the valve body, adjacent to the annular lip seals, in axially external positions with respect to the annular lip seals, wherein the third O-ring seal acts in sliding contact against the axially elongated internal cavity, and the fourth O-ring seal acts in sliding contact against the cylindrical surface of the cutoff piston.

* * * * *